US011807100B2

(12) United States Patent
Kawamoto et al.

(10) Patent No.: US 11,807,100 B2
(45) Date of Patent: Nov. 7, 2023

(54) VEHICLE DRIVE TRANSMISSION APPARATUS (71) Applicant: AISIN CORPORATION, Aichi (JP)

(72) Inventors: Masaki Kawamoto, Kariya (JP); Mitsuhiro Ichioka, Kariya (JP); Tomoka Yamamoto, Kariya (JP); Akira Inoue, Kariya (JP); Hiroshi Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 7 days.

(21) Appl. No.: 17/621,569

(22) PCT Filed: Jul. 7, 2020

(86) PCT No.: PCT/JP2020/026536
§ 371 (c)(1),
(2) Date: Dec. 21, 2021

(87) PCT Pub. No.: WO2021/039134
PCT Pub. Date: Mar. 4, 2021

(65) Prior Publication Data
US 2022/0355657 A1 Nov. 10, 2022

(30) Foreign Application Priority Data
Aug. 29, 2019 (JP) ................................. 2019-157277

(51) Int. Cl.
B60K 6/36 (2007.10)
B60K 6/40 (2007.10)
(Continued)

(52) U.S. Cl.
CPC ................. B60K 6/36 (2013.01); B60K 6/40 (2013.01); B60K 6/547 (2013.01); B60K 17/08 (2013.01);
(Continued)

(58) Field of Classification Search
CPC . B60K 6/36; B60K 6/40; B60K 6/547; B60K 17/08; B60K 17/165; B60K 1/00;
(Continued)

(56) References Cited

U.S. PATENT DOCUMENTS 7,150,698 B2 * 12/2006 Sakamoto ............... F16H 3/126
192/48.91
9,050,971 B2 * 6/2015 Atarashi ............... B60W 20/10
(Continued)

FOREIGN PATENT DOCUMENTS

DE 10 2011 102 267 A1 11/2012
EP 3 305 615 A1 4/2018
(Continued)

OTHER PUBLICATIONS

Sep. 24, 2020 International Search Report issued in International Patent Application No. PCT/JP2020/026536.
(Continued)

Primary Examiner — Tinh Dang
(74) Attorney, Agent, or Firm — Oliff PLC (57) ABSTRACT A counter gear mechanism includes: a fifth gear in mesh with a third gear; a sixth gear in mesh with a fourth gear; and a seventh gear in mesh with a differential input gear. The seventh gear is disposed between the fifth gear and the sixth gear in an axial direction. A switching mechanism is disposed between the third gear and the fourth gear in the axial direction. The switching mechanism makes switching among: a state in which the third gear is coupled to a second input member; a state in which the fourth gear is coupled to the second input member; and a state in which the third gear and the fourth gear are decoupled from the second input member. This structure is able to make an entirety of an apparatus compact in size in the axial direction when the apparatus includes the switching mechanism to change the (Continued)

speed ratio between the second input member, which is drivingly coupled to an internal combustion engine, and output members.

20 Claims, 3 Drawing Sheets (51) Int. Cl.
*B60K 6/547* (2007.10)
*F16H 37/08* (2006.01)
*B60K 17/16* (2006.01)
*B60K 17/08* (2006.01)
*F16H 48/40* (2012.01)
*F16H 48/42* (2012.01)

(52) U.S. Cl.
CPC .......... *B60K 17/165* (2013.01); *F16H 37/08* (2013.01); *F16H 2048/405* (2013.01); *F16H 2048/423* (2013.01)

(58) Field of Classification Search
CPC .......... B60K 1/02; B60K 17/02; B60K 17/06; B60K 2006/4833; B60K 6/387; B60K 6/442; B60K 17/04; B60K 17/16; F16H 37/08; F16H 2048/405; F16H 2048/423; F16H 2003/0811; F16H 3/089; F16H 48/08; F16H 2200/0034; Y02T 10/62
See application file for complete search history.

(56) References Cited

U.S. PATENT DOCUMENTS

| | | | | |
|---|---|---|---|---|
| 9,199,530 B2* | 12/2015 | Kim | .................. | B60K 6/547 |
| 9,764,631 B2* | 9/2017 | Kim | .................. | B60K 6/36 |
| 9,951,850 B2 | 4/2018 | Kramer et al. | | |
| 10,183,569 B2* | 1/2019 | Toyota | .................. | B60W 10/06 |
| 10,279,673 B2* | 5/2019 | Tsukizaki | ................ | F16H 61/02 |
| 10,814,713 B2* | 10/2020 | Ogino | .................. | B60K 6/365 |
| 2014/0080650 A1 | 3/2014 | Ruhle et al. | | |
| 2017/0175863 A1 | 6/2017 | Kramer et al. | | |
| 2019/0291563 A1 | 9/2019 | Ogino et al. | | |

FOREIGN PATENT DOCUMENTS

| | | |
|---|---|---|
| EP | 3 453 550 A1 | 3/2019 |
| JP | 2017-222197 A | 12/2017 |
| WO | 2015/149874 A1 | 10/2015 |
| WO | 2016/194172 A1 | 12/2016 |
| WO | 2017/217065 A1 | 12/2017 |

OTHER PUBLICATIONS

May 24, 2022 Extended Search Report issued in European Patent Application No. 20858141.3.

* cited by examiner

VEHICLE DRIVE TRANSMISSION APPARATUS

TECHNICAL FIELD

The present disclosure relates to vehicle drive transmission apparatuses each including a first input member drivingly coupled to a rotary electric machine, a second input member drivingly coupled to an internal combustion engine, and a differential gear unit to distribute rotation of a differential input gear to a pair of output members.

BACKGROUND ART

An example of the vehicle drive transmission apparatuses mentioned above is disclosed in Japanese Unexamined Patent Application Publication No. 2017-222197 (JP 2017-222197 A), which will be referred to as "Patent Document 1". Reference signs within parentheses in the following description of BACKGROUND ART and problems therein correspond to those used in Patent Document 1. A transaxle (1) illustrated in FIG. 3 of Patent Document 1 includes: an input shaft (11) drivingly coupled to an engine (2); a motor shaft (13) drivingly coupled to a motor (3); a generator shaft (14) drivingly coupled to a generator (4); and a differential gear (18) to distribute rotation of a ring gear (18a) to a pair of output shafts (12). In the transaxle (1), the following three power transmission paths are defined: a power transmission path leading from the input shaft (11) to the output shafts (12); a power transmission path leading from the motor shaft (13) to the output shafts (12); and a power transmission path leading from the input shaft (11) to the generator shaft (14). The transaxle (1) is thus structured to enable three travel modes, i.e., an EV mode, a series mode, and a parallel mode.

The transaxle (1) illustrated in FIG. 3 of Patent Document 1 includes a switching mechanism (20A) to change the speed ratio between the input shaft (11) and the output shafts (12). Specifically, the input shaft (11) is provided with two idle gears (11H, 11L), and a first counter shaft (15), which is disposed on the power transmission path between the input shaft (11) and the output shafts (12), is provided with two stationary gears (15H, 15L) in mesh with the two idle gears (11H, 11L). A first one (11H) of the idle gears is in mesh with a first one (15H) of the stationary gears so as to provide a high gear speed. A second one (11L) of the idle gears is in mesh with a second one (15L) of the stationary gears so as to provide a low gear speed. The switching mechanism (20A) is structured to make switching among: a state in which rotation of the input shaft (11) is transmitted to neither of the two idle gears (11H, 11L) such that the two idle gears (11H, 11L) idle; a state in which rotation of the input shaft (11) is transmitted to the first one (11H) of the idle gears such that the high gear speed is provided; and a state in which rotation of the input shaft (11) is transmitted to the second one (11L) of the idle gears such that the low gear speed is provided.

RELATED ART DOCUMENTS

Patent Documents

Patent Document 1: JP 2017-222197 A

SUMMARY OF THE DISCLOSURE

Problem to be Solved by the Invention

In the transaxle (1) illustrated in FIG. 3 of Patent Document 1, the switching mechanism (20A) is disposed between the two idle gears (11H, 11L) in an axial direction. The first counter shaft (15) is provided with the two stationary gears (15H, 15L) in mesh with the two idle gears (11H, 11L) and disposed side by side in the axial direction. A stationary gear (15a) in mesh with the ring gear (18a) of the differential gear (18) is provided on one side in the axial direction relative to the two stationary gears (15H, 15L). As illustrated in FIG. 3 of Patent Document 1, the location of the differential gear (18) in the axial direction thus tends to relatively greatly deviate to one side in the axial direction relative to the location of the switching mechanism (20A) in the axial direction, so that an entirety of the transaxle (1) is prone to be large in axial size.

Accordingly, an apparatus including a switching mechanism to change the speed ratio between an input member, which is drivingly coupled to an internal combustion engine, and output members creates the need to develop a technique for making an entirety of the apparatus compact in axial size.

Means for Solving the Problem

A vehicle drive transmission apparatus includes: a first input member drivingly coupled to a rotary electric machine; a second input member drivingly coupled to an internal combustion engine; a differential gear unit that includes a differential input gear and distributes rotation of the differential input gear to a pair of output members each drivingly coupled to an associated one of wheels; a first gear mechanism that drivingly couples the first input member and the second input member to each other; and a second gear mechanism that drivingly couples the second input member and the differential input gear to each other. The first gear mechanism includes: a first gear that rotates together with the first input member; and a second gear that rotates together with the second input member and is in mesh with the first gear. The second gear mechanism includes: a third gear coaxial with the second input member; a fourth gear coaxial with the second input member; and a counter gear mechanism. The counter gear mechanism includes: a counter shaft; a fifth gear that rotates together with the counter shaft and is in mesh with the third gear; a sixth gear that rotates together with the counter shaft and is in mesh with the fourth gear; and a seventh gear that rotates together with the counter shaft and is in mesh with the differential input gear. A gear ratio between the third gear and the fifth gear differs from a gear ratio between the fourth gear and the sixth gear. The seventh gear is disposed between the fifth gear and the sixth gear in an axial direction. A switching mechanism is disposed between the third gear and the fourth gear in the axial direction. The switching mechanism makes switching among: a state in which only the third gear of the third and fourth gears is coupled to the second input member; a state in which only the fourth gear of the third and fourth gears is coupled to the second input member; and a state in which both of the third gear and the fourth gear are decoupled from the second input member.

In this structure, the third gear or the fourth gear is coupled to the second input member through the switching mechanism so as to connect a power transmission path between the second input member and the differential input gear. This enables the vehicle drive transmission apparatus to enter a travel mode (e.g., a parallel mode) in which the output members are driven by at least the driving force of the internal combustion engine so as to cause a vehicle to travel. The third gear is in mesh with the fifth gear that rotates together with the counter shaft, and the fourth gear is in mesh with the sixth gear that rotates together with the counter shaft. The gear ratio between the third gear and the fifth gear differs from the gear ratio between the fourth gear and the sixth gear. Consequently, the speed ratio between the second input member and the output members is changeable by switching between the state where the third gear is coupled to the second input member and the state where the fourth gear is coupled to the second input member, which is made by the switching mechanism.

In the present structure, the seventh gear, which rotates together with the counter shaft and is in mesh with the differential input gear, is disposed between the fifth gear and the sixth gear in the axial direction, and the switching mechanism is disposed between the third gear and the fourth gear in the axial direction. The third gear is in mesh with the fifth gear, and the fourth gear is in mesh with the sixth gear. Thus, disposing the switching mechanism between the third gear and the fourth gear in the axial direction enables the switching mechanism to be disposed such that the location of the switching mechanism in the axial direction overlaps with the location of the seventh gear in the axial direction. This enables effective use of a space radially outward of the seventh gear in disposing the switching mechanism. The seventh gear in mesh with the differential input gear is disposed between the fifth gear and the sixth gear in the axial direction. Accordingly, the present structure facilitates disposing the differential gear unit such that the area of overlapping of the locations of the differential gear unit and the switching mechanism in the axial direction is larger than when the seventh gear is disposed on one of sides in the axial direction relative to the fifth gear and the sixth gear. Consequently, the present structure is able to make an entirety of the apparatus compact in axial size when the apparatus includes the switching mechanism to change the speed ratio between the second input member, which is drivingly coupled to the internal combustion engine, and the output members.

Further features and advantages of the vehicle drive transmission apparatus will be apparent from the description of embodiments given below with reference to the drawings.

MODES FOR CARRYING OUT THE DISCLOSURE

Embodiments of the vehicle drive transmission apparatus will be described with reference to the drawings. Directions for components in the following description indicate directions for the components assembled to the vehicle drive transmission apparatus. As used herein, terms related to, for example, the dimensions, orientations, and locations of components disposed conceptually include a state where there is a difference resulting from an error (e.g., an error allowable in the course of manufacture).

As used herein, the term "drivingly coupled" refers to a state where two rotary elements are coupled to each other such that a driving force (which is synonymous with torque) is transmittable therebetween, and encompasses a state where the two rotary elements are coupled to each other such that the two rotary elements rotate together or a state where the two rotary elements are coupled to each other through one or two or more transmission members such that a driving force is transmittable therebetween. Such transmission members include various members (e.g., a shaft, a gear mechanism, a belt, and a chain) that transmit rotation at equal or varying speeds. Such transmission members may include engagement devices (e.g., a friction engagement device and a meshing type engagement device) that transmit rotation and driving force selectively.

As used herein, the term "rotary electric machine" is used as a concept encompassing all of a motor (electric motor), a generator (power generator), and a motor generator that functions as both of a motor and a generator when necessary. When a virtual straight line parallel to the direction of a line of sight is moved in directions perpendicular to the virtual straight line, the term "overlapping as viewed in a particular direction" as used herein for the locations of two components refers to at least partial presence of a region where the virtual straight line intersects both of the two components. The term "overlapping of locations in an axial direction" as used herein for the locations of two components refers to inclusion of at least a portion of the axial location of one of the components in the axial location of the other one of the components.

Figure 1:
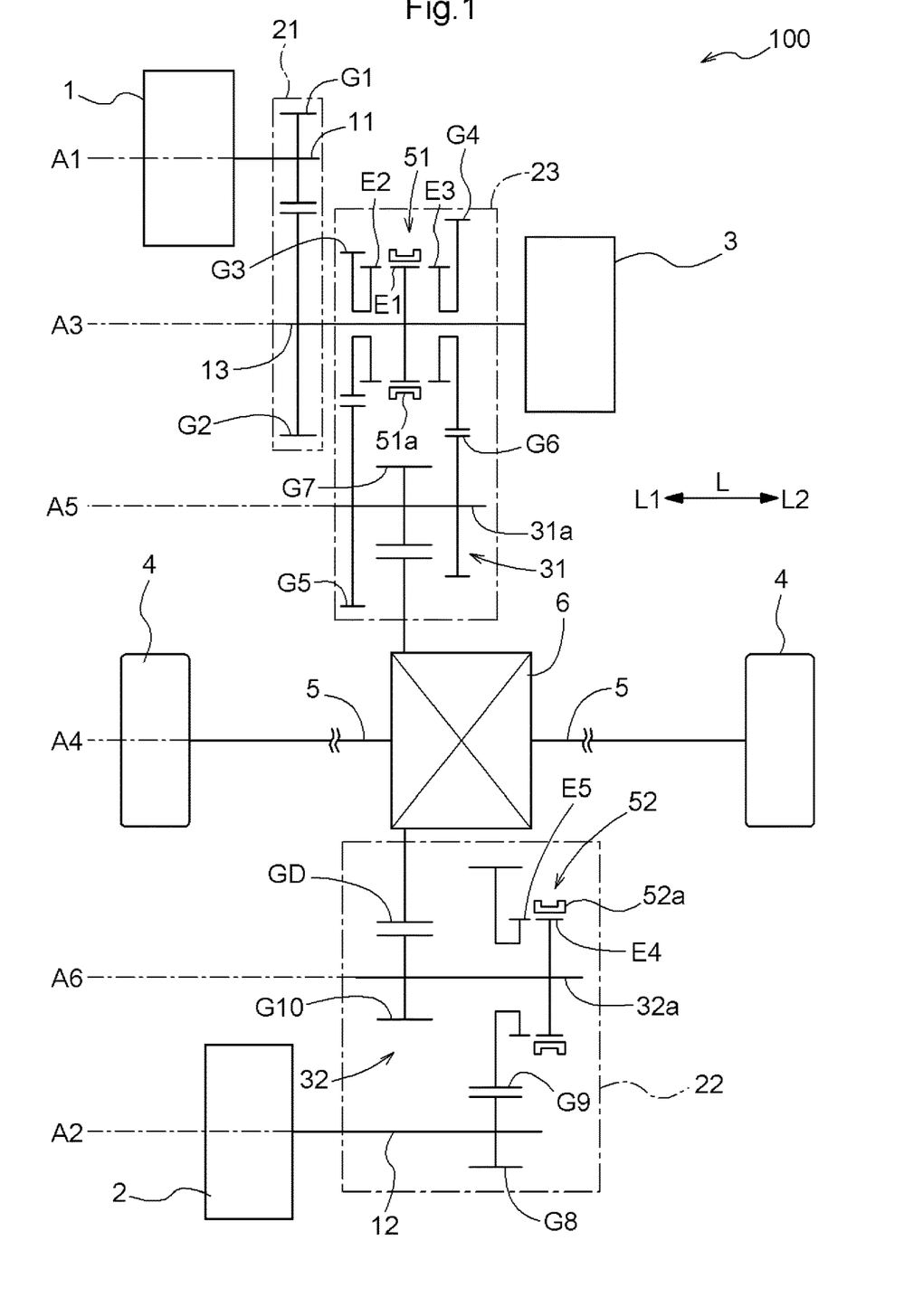
FIG. 1 is a skeleton diagram of a vehicle drive transmission apparatus according to an embodiment.

As illustrated in FIG. 1, a vehicle drive transmission apparatus 100 includes: a first input member 11 drivingly coupled to a first rotary electric machine 1; and a second input member 13 drivingly coupled to an internal combustion engine 3. In the present embodiment, the vehicle drive transmission apparatus 100 further includes a third input member 12 drivingly coupled to a second rotary electric machine 2. The internal combustion engine 3 is a motor (e.g., a gasoline engine or a diesel engine) to be driven by combustion of fuel inside the engine such that power is derived therefrom. The first rotary electric machine 1 and the second rotary electric machine 2 are electrically connected to an electric storage device (not illustrated), such as a battery or a capacitor. The first rotary electric machine 1 and the second rotary electric machine 2 each receive supply of electric power from the electric storage device so as to enable power running or supply electric power, generated by, for example, the inertial force of a vehicle or the driving force of the internal combustion engine 3, to the electric storage device such that the electric power is stored therein. The first rotary electric machine 1 and the second rotary electric machine 2 are electrically connected to the same electric storage device such that electric power generated by the first rotary electric machine 1 enables power running of the second rotary electric machine 2. In the present embodiment, the first rotary electric machine 1 corresponds to a "rotary electric machine".

In the present embodiment, the first input member 11 is coupled to the first rotary electric machine 1 such that the first input member 11 rotates together with the first rotary electric machine 1 (which is specifically a rotor of the first rotary electric machine 1, and the same goes for the following description), and the third input member 12 is coupled to the second rotary electric machine 2 such that the third input member 12 rotates together with the second rotary electric machine 2 (which is specifically a rotor of the second rotary electric machine 2, and the same goes for the following description). In the present embodiment, the second input member 13 is coupled to the internal combustion engine 3 (which is specifically an output member such as a crankshaft of the internal combustion engine 3, and the same goes for the following description) through a torque limiter 8 (see FIG. 2). The torque limiter 8 limits the magnitude of torque transmitted between the second input member 13 and the internal combustion engine 3 so as to cut off transmission of excessively large torque. The use of a damper device equipped with the torque limiter 8 (i.e., a damper device including a damper mechanism and the torque limiter 8) involves coupling the second input member 13 to the internal combustion engine 3 through the torque limiter 8 and the damper mechanism.

Figure 2:
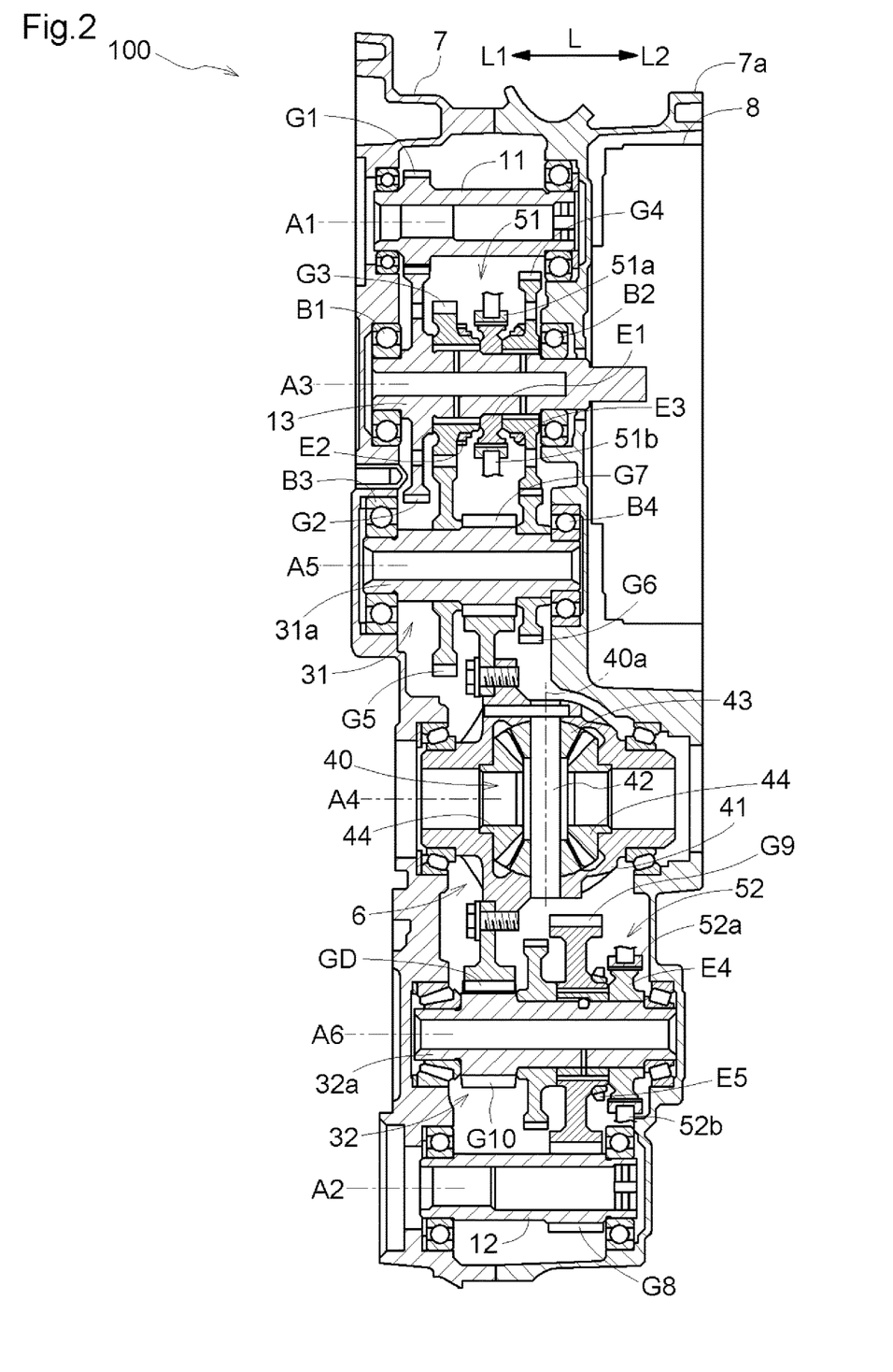
FIG. 2 is a cross-sectional view of the vehicle drive transmission apparatus according to the embodiment.

As illustrated in FIG. 2, the vehicle drive transmission apparatus 100 includes a case 7. The first input member 11, the third input member 12, and the second input member 13 are each housed in the case 7. As used herein, the term "house" refers to housing at least a portion of an object to be housed. The first input member 11, the third input member 12, and the second input member 13 are each supported by the case 7 so as to be rotatable relative to the case 7. The case 7 also stores a differential gear unit 6, a first counter gear mechanism 31, and a second counter gear mechanism 32 (which will be described below).

The vehicle drive transmission apparatus 100 includes the differential gear unit 6. As illustrated in FIG. 1, the differential gear unit 6 includes a differential input gear GD. The differential gear unit 6 distributes rotation of the differential input gear GD to a pair of output members 5 each drivingly coupled to an associated one of wheels 4. Assuming that the wheel 4 to which one of the output members 5 is drivingly coupled is a first wheel and the wheel 4 to which the other output member 5 is drivingly coupled is a second wheel, the first wheel and the second wheel are a pair of right and left wheels 4 (e.g., a pair of right and left front wheels or a pair of right and left rear wheels). In the present embodiment, each output member 5 is a drive shaft. The output members 5 are each coupled to the associated wheel 4 such that each output member 5 and the coupling target wheel 4 rotate at equal speed. The output members 5 are each coupled to the coupling target wheel 4 through, for example, a constant velocity joint (not illustrated). Torque transmitted through the output members 5 drives the wheels 4, thus causing the vehicle (which is the vehicle equipped with the vehicle drive transmission apparatus 100, and the same goes for the following description) to travel.

As illustrated in FIG. 2, the differential gear unit 6 in the present embodiment includes a bevel gear type differential gear mechanism 40 and a differential case 41 housing the differential gear mechanism 40. The differential case 41 is supported by the case 7 so as to be rotatable relative to the case 7. The differential input gear GD is coupled to the differential case 41 such that the differential input gear GD rotates together with the differential case 41. Specifically, the differential input gear GD is attached to the differential case 41 such that the differential input gear GD protrudes outward of the differential case 41 in a radial direction (i.e., a radial direction with respect to a fourth axis A4, which will be described below).

The differential gear mechanism 40 includes pinion gear (s) 43 and a pair of side gears 44 each in mesh with the pinion gear(s) 43. The pinion gear(s) 43 (e.g., two pinion gears 43) is/are supported by a pinion shaft 42, which is held by the differential case 41, such that the pinion gear(s) 43 is/are rotatable relative to the pinion shaft 42. The differential gear mechanism 40 distributes rotation of the differential input gear GD to the pair of side gears 44. The side gears 44 are each coupled (or spline coupled) to the coupling target output member 5 such that each side gear 44 rotates together with the target output member 5.

In the present embodiment, the differential gear unit 6 includes the bevel gear type differential gear mechanism 40. The location of the pinion shaft 42 in an axial direction L (which will be described below) is determined at a center 40a of the differential gear mechanism 40 in the axial direction L. The differential gear unit 6 may be structured to include a planetary gear type differential gear mechanism 40. In this case, the central position(s) of meshing portions of the differential gear mechanism 40 (i.e., meshing portions of its gears) in the axial direction L is/are located at the center 40a of the differential gear mechanism 40 in the axial direction L.

As illustrated in FIGS. 1 and 2, the first input member 11 is disposed on a first axis A1, the third input member 12 is disposed on a second axis A2, the second input member 13 is disposed on a third axis A3, the differential gear unit 6 is disposed on the fourth axis A4, and the first counter gear mechanism 31 (which will be described below) is disposed on a fifth axis A5. In the present embodiment, the second counter gear mechanism 32 (which will be described below) is disposed on a sixth axis A6. The first axis A1, the second axis A2, the third axis A3, the fourth axis A4, the fifth axis A5, and the sixth axis A6 are axes (virtual axes) different from one another and in parallel with one another. The axial direction L is a direction parallel with each of the axes A1 to A6 (i.e., an axial direction common to the axes). A first side in the axial direction L is defined as a first axial side L1, and a second side in the axial direction L (which is opposite to the first axial side L1 in the axial direction L) is defined as a second axial side L2.

As illustrated in FIG. 1, the second input member 13 is disposed at a position different from the position of the internal combustion engine 3 in the axial direction L. Specifically, the second input member 13 is disposed on the first axial side L1 relative to the internal combustion engine 3. As illustrated in FIG. 2, an end of the case 7 on the second axial side L2 is provided with a fixed portion 7a through which the case 7 is fixed to the internal combustion engine 3. The fixed portion 7a is joined to the internal combustion engine 3 from the first axial side L1 with a fastener (not illustrated), such as a fastening bolt.

As illustrated in FIG. 1, the vehicle drive transmission apparatus 100 includes: a first gear mechanism 21 that drivingly couples the first input member 11 and the second input member 13 to each other; and a second gear mechanism 23 that drivingly couples the second input member 13 and the differential input gear GD to each other. The first gear mechanism 21 and the second gear mechanism 23 drivingly couple the first input member 11 to the differential input gear GD through the second input member 13. A first power transmission path, which is a power transmission path between the first input member 11 and the second input member 13, is connectable through the first gear mechanism 21. A second power transmission path, which is a power transmission path between the second input member 13 and the differential input gear GD, is connectable through the second gear mechanism 23. In the present embodiment, the first power transmission path is connected at all times, and the second power transmission path is selectively connected (i.e., connected or disconnected) through a first switching mechanism 51 (which will be described below). In the present embodiment, the vehicle drive transmission apparatus 100 further includes a third gear mechanism 22 that drivingly couples the third input member 12 and the differential input gear GD to each other without involvement by the second gear mechanism 23. A third power transmission path, which is a power transmission path between the third input member 12 and the differential input gear GD, is connectable through the third gear mechanism 22. In the present embodiment, the third power transmission path is selectively connected through a second switching mechanism 52 (which will be described below).

With the third power transmission path connected, the vehicle drive transmission apparatus 100 is able to enter an electric vehicle mode. With the first power transmission path connected and the third power transmission path connected, the vehicle drive transmission apparatus 100 is able to enter a series mode. The electric vehicle mode is a travel mode in which the driving force of the second rotary electric machine 2 drives the output members 5 so as to cause the vehicle to travel. The series mode is a travel mode in which the driving force of the internal combustion engine 3 causes the first rotary electric machine 1 to generate electric power and the driving force of the second rotary electric machine 2 drives the output members 5 so as to cause the vehicle to travel. During the electric vehicle mode and during the series mode, the second power transmission path is disconnected, and the first rotary electric machine 1 and the internal combustion engine 3 are thus disconnected from the output members 5.

With the second power transmission path connected and the third power transmission path connected, the vehicle drive transmission apparatus 100 is able to enter a parallel mode. The parallel mode is a travel mode in which at least the driving force of the internal combustion engine 3 drives the output members 5 so as to cause the vehicle to travel. During the parallel mode, the driving force of the second rotary electric machine 2 is transmitted to the output members 5 when necessary so as to supplement the driving force of the internal combustion engine 3. When the second rotary electric machine 2 is stopped during the parallel mode (e.g., when the vehicle travels at high speed), disconnecting the third power transmission path makes it possible to prevent energy loss caused by drag of the second rotary electric machine 2. During the parallel mode, in addition to or instead of the driving force of the second rotary electric machine 2, the driving force of the first rotary electric machine 1 may be transmitted to the output members 5 so as to supplement the driving force of the internal combustion engine 3.

Figure 3:
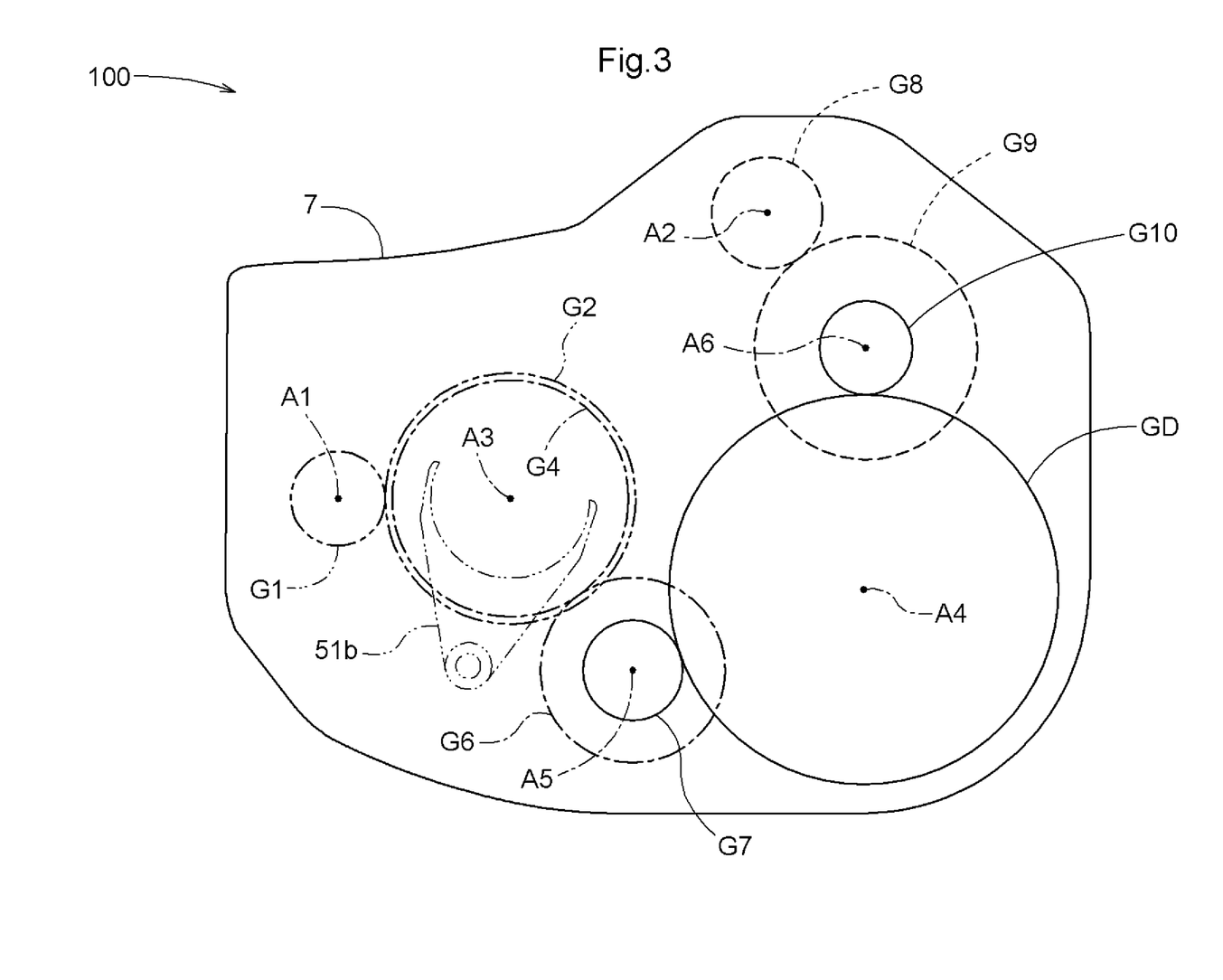
FIG. 3 is a diagram illustrating positional relationships among components of the vehicle drive transmission apparatus according to the embodiment as viewed in an axial direction.

As illustrated in FIG. 1, the first gear mechanism 21 includes: a first gear G1 that rotates together with the first input member 11; and a second gear G2 that rotates together with the second input member 13 and is in mesh with the first gear G1. The first input member 11 and the second input member 13 are coupled to each other at all times through a gear pair of the first gear G1 and the second gear G2. The first power transmission path between the first input member 11 and the second input member 13 is thus connected at all times. In the present embodiment, the first gear G1 is smaller in diameter than the second gear G2 as illustrated in FIGS. 1 to 3. To be more specific, the gear ratio between the first gear G1 and the second gear G2 is set such that rotation of the first input member 11 is decelerated and transmitted to the second input member 13 (i.e., such that rotation of the second input member 13 is accelerated and transmitted to the first input member 11). In FIG. 3, the reference pitch circle of each gear is illustrated such that the reference pitch circles of any two of the gears in mesh with each other are indicated by the same line type. In FIG. 3, the third gear G3 and the fifth gear G5 (which will be described below) are not illustrated.

The second gear mechanism 23 includes: a third gear G3 coaxial with the second input member 13; a fourth gear G4 coaxial with the second input member 13; and the first counter gear mechanism 31. The second gear mechanism 23 drivingly couples the second input member 13 and the differential input gear GD to each other through the first counter gear mechanism 31. The third gear G3 is disposed on the first axial side L1 relative to the fourth gear G4.

The first counter gear mechanism 31 includes: a first counter shaft 31a; a fifth gear G5 that rotates together with the first counter shaft 31a and is in mesh with the third gear G3; a sixth gear G6 that rotates together with the first counter shaft 31a and is in mesh with the fourth gear G4; and a seventh gear G7 that rotates together with the first counter shaft 31a and is in mesh with the differential input gear GD. The fifth gear G5 is disposed on the first axial side L1 relative to the sixth gear G6. The seventh gear G7 is disposed between the fifth gear G5 and the sixth gear G6 in the axial direction L.

In the present embodiment, the seventh gear G7 is smaller in diameter than the differential input gear GD as illustrated in FIGS. 1 to 3. To be more specific, the gear ratio between the seventh gear G7 and the differential input gear GD is set such that rotation of the first counter shaft 31a is decelerated and transmitted to the differential gear unit 6 (or specifically, the differential input gear GD). In the present embodiment, the first counter gear mechanism 31 corresponds to a "counter gear mechanism", and the first counter shaft 31a corresponds to a "counter shaft".

The second gear mechanism 23 is provided with the first switching mechanism 51 to make switching among: a state where only the third gear G3 of the third and fourth gears G3 and G4 is coupled to the second input member 13 (which will hereinafter be referred to as a "first coupled state"); a state where only the fourth gear G4 of the third and fourth gears G3 and G4 is coupled to the second input member 13 (which will hereinafter be referred to as a "second coupled state"); and a state where both of the third and fourth gears G3 and G4 are decoupled from the second input member 13 (which will hereinafter be referred to as a "decoupled state"). In the first coupled state and the second coupled state, the second power transmission path between the second input member 13 and the differential input gear GD is connected. In the decoupled state, the second power transmission path is disconnected. In the first coupled state, the fourth gear G4 is supported by the second input member 13 so as to be rotatable relative to the second input member 13. In the second coupled state, the third gear G3 is supported by the second input member 13 so as to be rotatable relative to the second input member 13. In the decoupled state, the third gear G3 and the fourth gear G4 are supported by the second input member 13 so as to be rotatable relative to the second input member 13. In the present embodiment, the first switching mechanism 51 corresponds to a "switching mechanism".

In the first coupled state, the rotational speed ratio between the second input member 13 and the first counter shaft 31a is determined in accordance with the gear ratio between the third gear G3 and the fifth gear G5. In the second coupled state, the rotational speed ratio is determined in accordance with the gear ratio between the fourth gear G4 and the sixth gear G6. The gear ratio between the third gear G3 and the fifth gear G5 is set to be different from the gear ratio between the fourth gear G4 and the sixth gear G6. Thus, switching between the first coupled state and the second coupled state, which is made by the first switching mechanism 51, changes the rotational speed ratio between the second input member 13 and the first counter shaft 31a to a different value.

In the present embodiment, assuming that the ratio of a rotational speed of the second input member 13 to a rotational speed of the differential input gear GD is a speed ratio, the gear ratio between the third gear G3 and the fifth gear G5 and the gear ratio between the fourth gear G4 and the sixth gear G6 are set such that the speed ratio in the first coupled state is higher than the speed ratio in the second coupled state. Accordingly, the first coupled state provides a low speed, and the second coupled state provides a high speed. In the present embodiment, the third gear G3 is smaller in diameter than the fourth gear G4, and the fifth gear G5 is larger in diameter than the sixth gear G6, because the gear ratio between the third gear G3 and the fifth gear G5 and the gear ratio between the fourth gear G4 and the sixth gear G6 are set as described above.

In the present embodiment, the third gear G3 is smaller in diameter than the fifth gear G5. The gear ratio between the third gear G3 and the fifth gear G5 is thus set such that rotation of the second input member 13 is decelerated and transmitted to the first counter shaft 31a. In the present embodiment, the fourth gear G4 is larger in diameter than the sixth gear G6. The gear ratio between the fourth gear G4 and the sixth gear G6 is thus set such that rotation of the second input member 13 is accelerated and transmitted to the first counter shaft 31a.

In the present embodiment, the first switching mechanism 51 includes a meshing type engagement device (e.g., a dog clutch). Specifically, the first switching mechanism 51 includes: a first sleeve member 51a movable in the axial direction L; a first engagement portion E1 that rotates together with the second input member 13; a second engagement portion E2 that rotates together with the third gear G3; and a third engagement portion E3 that rotates together with the fourth gear G4. The first sleeve member 51a, the first engagement portion E1, the second engagement portion E2, and the third engagement portion E3 are disposed on the third axis A3. In other words, the first switching mechanism 51 (or specifically, at least the first sleeve member 51a, the first engagement portion E1, the second engagement portion E2, and the third engagement portion E3) is coaxial with the second input member 13. In the present embodiment, the length of the first switching mechanism 51 measured in the axial direction L is longer than the length of the seventh gear G7 measured in the axial direction L (or specifically, the face width of the seventh gear G7 that is the length of each tooth of the seventh gear G7 measured in the axial direction L) as illustrated in FIG. 2. In the present embodiment, the length of the first switching mechanism 51 measured in the axial direction L corresponds to the length between the end of the second engagement portion E2 on the first axial side L1 and the end of the third engagement portion E3 on the second axial side L2, which is measured in the axial direction L. The length of the first switching mechanism 51 measured in the axial direction L may be equal to or shorter than the length of the seventh gear G7 measured in the axial direction L.

The position of the first sleeve member 51a in the axial direction L is shifted by a first shifting fork 51b (see FIGS. 2 and 3). The first shifting fork 51b is supported by the case 7 so as to be movable in the axial direction L. The first shifting fork 51b is in engagement with the first sleeve member 51a (or specifically, a groove defined in the outer peripheral surface of the first sleeve member 51a) such that the first shifting fork 51b moves together with the first sleeve member 51a in the axial direction L while rotation of the first sleeve member 51a (i.e., rotation of the first sleeve member 51a around the third axis A3) is allowed. The first shifting fork 51b is moved in the axial direction L by the driving force of an actuator, such as an electric actuator or a hydraulic actuator.

In the present embodiment, the inner peripheral surface of the first sleeve member 51a is provided with internal teeth, and the outer peripheral surfaces of the first engagement portion E1, the second engagement portion E2, and the third engagement portion E3 are each provided with external teeth. The first sleeve member 51a is disposed so as to be externally fitted to the first engagement portion E1. In this state, the first sleeve member 51a is coupled to the first engagement portion E1 such that the first sleeve member 51a is non-rotatable relative to the first engagement portion E1 and movable relative to the first engagement portion E1 in the axial direction L. The first engagement portion E1 (or specifically, the external teeth on the first engagement portion E1) is in engagement with the first sleeve member 51a (or specifically, the internal teeth on the first sleeve member 51a) irrespective of the position of the first sleeve member 51a in the axial direction L. The second engagement portion E2 (or specifically, the external teeth on the second engagement portion E2) and the third engagement portion E3 (or specifically, the external teeth on the third engagement portion E3) selectively come into engagement with the first sleeve member 51a (or specifically, the internal teeth on the first sleeve member 51a) in accordance with the position of the first sleeve member 51a in the axial direction L.

The first switching mechanism 51 is structured to make switching among the first coupled state, the second coupled state, and the decoupled state in accordance with the position of the first sleeve member 51a in the axial direction L. Specifically, switching is made to the decoupled state when the first sleeve member 51a has moved to a position in the axial direction L where the first sleeve member 51a is in engagement with the first engagement portion E1 but is in engagement with neither of the second engagement portion E2 and the third engagement portion E3 (see FIGS. 1 and 2). Switching is made to the first coupled state when the first sleeve member 51a has moved to a position in the axial direction L where the first sleeve member 51a is in engagement with the first engagement portion E1 and the second engagement portion E2 but is not in engagement with the third engagement portion E3 (i.e., a position located on the first axial side L1 relative to the position of the first sleeve member 51a illustrated in FIGS. 1 and 2). Switching is made to the second coupled state when the first sleeve member 51a has moved to a position in the axial direction L where the first sleeve member 51a is in engagement with the first engagement portion E1 and the third engagement portion E3 but is not in engagement with the second engagement portion E2 (i.e., a position located on the second axial side L2 relative to the position of the first sleeve member 51a illustrated in FIGS. 1 and 2).

As illustrated in FIGS. 1 and 2, the second engagement portion E2 is disposed on the second axial side L2 relative to the third gear G3, and the third engagement portion E3 is disposed on the second axial side L2 relative to the second engagement portion E2 and on the first axial side L1 relative to the fourth gear G4. The first engagement portion E1 is disposed between the second engagement portion E2 and the third engagement portion E3 in the axial direction L. The first engagement portion E1, the second engagement portion E2, and the third engagement portion E3 are thus disposed between the third gear G3 and the fourth gear G4 in the axial direction L. The first sleeve member 51a is also disposed between the third gear G3 and the fourth gear G4 in the axial direction L.

As described above, the first switching mechanism 51 is disposed between the third gear G3 and the fourth gear G4 in the axial direction L. Specifically, the components of the first switching mechanism 51 (i.e., the first sleeve member 51a, the first engagement portion E1, the second engagement portion E2, and the third engagement portion E3), which are coaxial with the second input member 13 (i.e., located on the third axis A3), are disposed between the third gear G3 and the fourth gear G4 in the axial direction L. In the present embodiment, the first engagement portion E1, the second engagement portion E2, and the third engagement portion E3 are each smaller in diameter than one of the third and fourth gears G3 and G4 smaller in diameter (which is the third gear G3 in the present embodiment) than the other one of the third and fourth gears G3 and G4. In this embodiment, the first engagement portion E1, the second engagement portion E2, and the third engagement portion E3 are equal in diameter.

As described above, the first switching mechanism 51 of the vehicle drive transmission apparatus 100 is disposed between the third gear G3 and the fourth gear G4 in the axial direction L. As previously mentioned, the seventh gear G7 of the vehicle drive transmission apparatus 100 is disposed between the fifth gear G5, which is in mesh with the third gear G3, and the sixth gear G6, which is in mesh with the fourth gear G4, in the axial direction L. This enables the first switching mechanism 51 to be disposed such that the location of the first switching mechanism 51 in the axial direction L overlaps with the location of the seventh gear G7 in the axial direction L as illustrated in FIGS. 1 and 2. In the present embodiment, the location of the seventh gear G7 in the axial direction L and the location of the first switching mechanism 51 in the axial direction L overlap with each other. In other words, the first switching mechanism 51 is disposed to overlap with the seventh gear G7 in a radial view along a radial direction (i.e., a radial direction with respect to the fifth axis A5) in a region extending in a circumferential direction (i.e., a circumferential direction with respect to the fifth axis A5). This enables effective use of a space radially outward of the seventh gear G7 (i.e., radially outward with respect to the fifth axis A5) in disposing the first switching mechanism 51. The seventh gear G7 in mesh with the differential input gear GD is disposed between the fifth gear G5 and the sixth gear G6 in the axial direction L. Accordingly, the present embodiment facilitates disposing the differential gear unit 6 such that the area of overlapping of the locations of the differential gear unit 6 and the first switching mechanism 51 in the axial direction L is larger than when the seventh gear G7 is disposed on one of the sides in the axial direction L (e.g., on the second axial side L2) relative to the fifth gear G5 and the sixth gear G6. Consequently, the present embodiment is able to make an entirety of the apparatus compact in size in the axial direction L.

As illustrated in FIG. 2, the second input member 13 in the present embodiment is supported by the case 7 at two positions in the axial direction L through a first bearing B1 and a second bearing B2 disposed on the second axial side L2 relative to the first bearing B1. The second gear G2, the third gear G3, and the fourth gear G4 are disposed between the first bearing B1 and the second bearing B2 in the axial direction L. In the present embodiment, the first counter shaft 31a is supported by the case 7 at two positions in the axial direction L through a third bearing B3 and a fourth bearing B4 disposed on the second axial side L2 relative to the third bearing B3. The fifth gear G5, the sixth gear G6, and the seventh gear G7 are disposed between the third bearing B3 and the fourth bearing B4 in the axial direction L. In the present embodiment, the third bearing B3 is disposed such that the location of the third bearing B3 in the axial direction L overlaps with the location of the first bearing B1 in the axial direction L, and the fourth bearing B4 is disposed such that the location of the fourth bearing B4 in the axial direction L overlaps with the location of the second bearing B2 in the axial direction L.

As illustrated in FIGS. 1 and 2, the seventh gear G7 in the present embodiment is smaller in diameter than the fifth gear G5 and smaller in diameter than the sixth gear G6. Thus, a space located radially outward of the seventh gear G7 (i.e., radially outward with respect to the fifth axis A5) is created such that each side of the space in the axial direction L is defined by an associated one of the fifth gear G5 and the sixth gear G6 and the space is open radially outward. This enables use of the space or a space radially outwardly adjacent thereto in disposing the first switching mechanism 51 or a mechanism for driving the first switching mechanism 51 (e.g., the first shifting fork 51b). In one example, the first shifting fork 51b may be disposed to overlap with one of the fifth and sixth gears G5 and G6 larger in diameter (which is the fifth gear G5 in the present embodiment) than the other one of the fifth and sixth gears G5 and G6 in an axial view along the axial direction L. In another example, the first shifting fork 51b may be disposed to overlap with the fifth gear G5 and the sixth gear G6 in the axial view along the axial direction L.

In the present embodiment, the second gear G2 is disposed on the first axial side L1 (i.e., disposed opposite to the location of the internal combustion engine 3 in the axial direction L) relative to the third gear G3 and the fourth gear G4. Thus, the third gear G3 and the fourth gear G4 are disposed toward the second axial side L2 more easily than when the second gear G2 is disposed on the second axial side L2 relative to the third gear G3 and the fourth gear G4. Accordingly, the seventh gear G7 and the differential input gear GD in mesh therewith are easily disposed toward the second axial side L2. In the present embodiment, a portion of the differential gear unit 6 (or specifically, the differential case 41) located on the second axial side L2 is disposed to overlap with the location of the torque limiter 8 in the axial direction L as illustrated in FIG. 2. Thus, the differential input gear GD is disposed toward the second axial side L2 so as to facilitate increasing the area of overlapping of the locations of the differential gear unit 6 and the torque limiter 8 in the axial direction L. Consequently, the present embodiment facilitates reducing the size of an entirety of the vehicle drive transmission apparatus 100, or the size of an entirety of a unit including the vehicle drive transmission apparatus 100 and the torque limiter 8, in the axial direction L.

In the present embodiment, the differential input gear GD is disposed on the first axial side L1 relative to the center 40a of the differential gear mechanism 40 in the axial direction L. In the present embodiment, a portion of the differential case 41 disposed at the center 40a is larger in a radial direction (i.e., a radial direction with respect to the fourth axis A4) than a portion of the differential case 41 located on the first axial side L1 relative to the differential input gear GD. The fifth gear G5 larger in diameter than the sixth gear G6 is disposed on the first axial side L1 relative to the seventh gear G7 (i.e., disposed on the first axial side L1 relative to the differential input gear GD). Disposing the differential input gear GD and the fifth gear G5 as described above facilitates disposing the fifth gear G5 at a position away in the axial direction L from the center 40a at which the differential gear unit 6 is likely to have a large radial size.

Consequently, the fifth axis A5 on which the first counter gear mechanism 31 is located and the fourth axis A4 on which the differential gear unit 6 is located are easily disposed closer to each other in the axial view along the axial direction L, while the fifth and sixth gears G5 and G6 and the differential gear unit 6 are prevented from interfering with each other.

The vehicle drive transmission apparatus 100 according to the present embodiment makes switching from the decoupled state to the first coupled state, with the rotational speed of the second input member 13 controlled in accordance with (or for synchronization with) the rotational speed of the third gear G3, and makes switching from the decoupled state to the second coupled state, with the rotational speed of the second input member 13 controlled in accordance with the rotational speed of the fourth gear G4. In the present embodiment, the first switching mechanism 51 is thus provided with no synchronization mechanism.

As illustrated in FIG. 1, the third gear mechanism 22 includes an eighth gear G8 coaxial with the third input member 12. In the present embodiment, the third gear mechanism 22 includes the second counter gear mechanism 32. The third gear mechanism 22 drivingly couples the third input member 12 and the differential input gear GD to each other through the second counter gear mechanism 32. The second counter gear mechanism 32 includes: a second counter shaft 32a; a ninth gear G9 coaxial with the second counter shaft 32a and in mesh with the eighth gear G8; and a tenth gear G10 that rotates together with the second counter shaft 32a and is in mesh with the differential input gear GD. In the present embodiment, the eighth gear G8 is smaller in diameter than the ninth gear G9, and the tenth gear G10 is smaller in diameter than the differential input gear GD.

In the present embodiment, the third gear mechanism 22 is provided with the second switching mechanism 52 to selectively connect the third power transmission path between the third input member 12 and the differential input gear GD. Specifically, the eighth gear G8 is coupled to the third input member 12 such that the eighth gear G8 rotates together with the third input member 12. The second switching mechanism 52 is structured to make switching between a state where the ninth gear G9 is coupled to the second counter shaft 32a and a state where the ninth gear G9 is decoupled from the second counter shaft 32a. With the ninth gear G9 coupled to the second counter shaft 32a, the third power transmission path is connected. With the ninth gear G9 decoupled from the second counter shaft 32a, the third power transmission path is disconnected. With the ninth gear G9 decoupled from the second counter shaft 32a, the ninth gear G9 is supported by the second counter shaft 32a so as to be rotatable relative to the second counter shaft 32a.

In the present embodiment, the second switching mechanism 52 includes a meshing type engagement device (e.g., a dog clutch). Specifically, the second switching mechanism 52 includes: a second sleeve member 52a movable in the axial direction L; a fourth engagement portion E4 that rotates together with the second counter shaft 32a; and a fifth engagement portion E5 that rotates together with the ninth gear G9. The second sleeve member 52a, the fourth engagement portion E4, and the fifth engagement portion E5 are disposed on the sixth axis A6. The position of the second sleeve member 52a in the axial direction L is shifted by a second shifting fork 52b (see FIG. 2). The second shifting fork 52b is supported by the case 7 so as to be movable in the axial direction L. The second shifting fork 52b is in engagement with the second sleeve member 52a (or specifically, a groove defined in the outer peripheral surface of the second sleeve member 52a) such that the second shifting fork 52b moves together with the second sleeve member 52a in the axial direction L while rotation of the second sleeve member 52a (i.e., rotation of the second sleeve member 52a around the sixth axis A6) is allowed. The second shifting fork 52b is moved in the axial direction L by the driving force of an actuator, such as an electric actuator or a hydraulic actuator.

The second switching mechanism 52 is structured to make, in accordance with the position of the second sleeve member 52a in the axial direction L, switching between the state where the third power transmission path is connected (which is the state where the ninth gear G9 is coupled to the second counter shaft 32a in the present embodiment) and the state where the third power transmission path is disconnected (which is the state where the ninth gear G9 is decoupled from the second counter shaft 32a in the present embodiment). Specifically, the third power transmission path is disconnected when the second sleeve member 52a has moved to a position in the axial direction L where the second sleeve member 52a is in engagement with the fourth engagement portion E4 but is not in engagement with the fifth engagement portion E5 (see FIGS. 1 and 2). The third power transmission path is connected when the second sleeve member 52a has moved to a position in the axial direction L where the second sleeve member 52a is in engagement with the fourth engagement portion E4 and the fifth engagement portion E5.

Alternative Embodiments

Alternative embodiments of the vehicle drive transmission apparatus will be described below.

(1) The above embodiment has illustrated, by way of example, the second gear G2 structured such that the second gear G2 is disposed on the first axial side L1 relative to the third gear G3 and the fourth gear G4. The present disclosure, however, is not limited to such a structure. The second gear G2 may be structured such that the second gear G2 is disposed on the second axial side L2 (i.e., one of the sides in the axial direction L where the internal combustion engine 3 is disposed) relative to the third gear G3 and the fourth gear G4.

(2) The above embodiment has illustrated, by way of example, the seventh gear G7 structured such that the seventh gear G7 is smaller in diameter than the fifth gear G5 and smaller in diameter than the sixth gear G6. The present disclosure, however, is not limited to such a structure. The seventh gear G7 may be structured such that the seventh gear G7 is larger in diameter than at least one of the fifth gear G5 and the sixth gear G6.

(3) The above embodiment has illustrated, by way of example, the differential input gear GD structured such that the differential input gear GD is disposed on the first axial side L1 relative to the center 40a of the differential gear mechanism 40 in the axial direction L. The present disclosure, however, is not limited to such a structure. The differential input gear GD may be structured such that the differential input gear GD is disposed at the same position in the axial direction L as the center 40a of the differential gear mechanism 40 in the axial direction L. The differential input gear GD may be structured such that the differential input gear GD is disposed on the second axial side L2 relative to the center 40a of the differential gear mechanism 40 in the axial direction L.

(4) The above embodiment has illustrated, by way of example, the structure in which the gear ratio between the third gear G3 and the fifth gear G5 and the gear ratio between the fourth gear G4 and the sixth gear G6 are set such that the speed ratio in the first coupled state is higher than the speed ratio in the second coupled state. The present disclosure, however, is not limited to such a structure. The gear ratio between the third gear G3 and the fifth gear G5 and the gear ratio between the fourth gear G4 and the sixth gear G6 may be set such that the speed ratio in the first coupled state is lower than the speed ratio in the second coupled state. In this case, the third gear G3 is larger in diameter than the fourth gear G4, and the fifth gear G5 is smaller in diameter than the sixth gear G6.

(5) The above embodiment has illustrated, by way of example, the case where the eighth gear G8 is coupled to the third input member 12 such that the eighth gear G8 rotates together with the third input member 12, and the second switching mechanism 52 is structured to make switching between the state where the ninth gear G9 is coupled to the second counter shaft 32a and the state where the ninth gear G9 is decoupled from the second counter shaft 32a. The present disclosure, however, is not limited to such a structure. The ninth gear G9 may be coupled to the second counter shaft 32a such that the ninth gear G9 rotates together with the second counter shaft 32a, and the second switching mechanism 52 may be structured to make switching between the state where the eighth gear G8 is coupled to the third input member 12 and the state where the eighth gear G8 is decoupled from the third input member 12. In other words, the second switching mechanism 52 may be structured such that the second switching mechanism 52 is not coaxial with the second counter gear mechanism 32 but is coaxial with the third input member 12.

(6) The above embodiment has illustrated, by way of example, the structure in which the third gear mechanism 22 is provided with the second switching mechanism 52 to selectively connect the power transmission path between the third input member 12 and the differential input gear GD. The present disclosure, however, is not limited to such a structure. In an alternative structure, the third gear mechanism 22 may be provided with no second switching mechanism 52, and the power transmission path between the third input member 12 and the differential input gear GD may be connected at all times.

(7) The above embodiment has illustrated, by way of example, the third gear mechanism 22 structured to drivingly couple the third input member 12 and the differential input gear GD to each other through the second counter gear mechanism 32. The present disclosure, however, is not limited to such a structure. The third gear mechanism 22 may be structured to drivingly couple the third input member 12 and the differential input gear GD without involvement by the second counter gear mechanism 32. In one example, the eighth gear G8 may be disposed in mesh with the differential input gear GD.

(8) The above embodiment has illustrated, by way of example, the vehicle drive transmission apparatus 100 structured to include: the third input member 12 drivingly coupled to the second rotary electric machine 2; and the third gear mechanism 22 that drivingly couples the third input member 12 and the differential input gear GD to each other without involvement by the second gear mechanism 23. The present disclosure, however, is not limited to such a structure. The vehicle drive transmission apparatus 100 may be structured to include neither the third input member 12 nor the third gear mechanism 22.

(9) The above embodiment has illustrated, by way of example, the case where the first switching mechanism 51 includes a meshing type engagement device. The present disclosure, however, is not limited to such a structure. The first switching mechanism 51 may include a friction engagement device. The above embodiment has illustrated, by way of example, the case where the second switching mechanism 52 includes a meshing type engagement device. The present disclosure, however, is not limited to such a structure. The second switching mechanism 52 may include a friction engagement device.

(10) The structure(s) disclosed in each of the above-described embodiments may be used in combination with structure(s) disclosed in other embodiment(s) as long as no contradiction arises. The present disclosure includes any combination of the alternative embodiments described above. Other structures of the embodiments disclosed herein are merely illustrative in all respects. Accordingly, various changes may be made as appropriate without departing from the spirit of the present disclosure.

SUMMARY OF PRESENT EMBODIMENT

A summary of the vehicle drive transmission apparatus described above will be given below.

A vehicle drive transmission apparatus (100) includes: a first input member (11) drivingly coupled to a rotary electric machine (1); a second input member (13) drivingly coupled to an internal combustion engine (3); a differential gear unit (6) that includes a differential input gear (GD) and distributes rotation of the differential input gear (GD) to a pair of output members (5) each drivingly coupled to an associated one of wheels (4); a first gear mechanism (21) that drivingly couples the first input member (11) and the second input member (13) to each other; and a second gear mechanism (23) that drivingly couples the second input member (13) and the differential input gear (GD) to each other. The first gear mechanism (21) includes: a first gear (G1) that rotates together with the first input member (11); and a second gear (G2) that rotates together with the second input member (13) and is in mesh with the first gear (G1). The second gear mechanism (23) includes: a third gear (G3) coaxial with the second input member (13); a fourth gear (G4) coaxial with the second input member (13); and a counter gear mechanism (31). The counter gear mechanism (31) includes: a counter shaft (31a); a fifth gear (G5) that rotates together with the counter shaft (31a) and is in mesh with the third gear (G3); a sixth gear (G6) that rotates together with the counter shaft (31a) and is in mesh with the fourth gear (G4); and a seventh gear (G7) that rotates together with the counter shaft (31a) and is in mesh with the differential input gear (GD). A gear ratio between the third gear (G3) and the fifth gear (G5) differs from a gear ratio between the fourth gear (G4) and the sixth gear (G6). The seventh gear (G7) is disposed between the fifth gear (G5) and the sixth gear (G6) in an axial direction (L). A switching mechanism (51) is disposed between the third gear (G3) and the fourth gear (G4) in the axial direction (L). The switching mechanism (51) makes switching among: a state in which only the third gear (G3) of the third and fourth gears (G3, G4) is coupled to the second input member (13); a state in which only the fourth gear (G4) of the third and fourth gears (G3, G4) is coupled to the second input member (13); and a state in which both of the third gear (G3) and the fourth gear (G4) are decoupled from the second input member (13).

In this structure, the third gear (G3) or the fourth gear (G4) is coupled to the second input member (13) through the switching mechanism (51) so as to connect a power transmission path between the second input member (13) and the differential input gear (GD). This enables the vehicle drive transmission apparatus (100) to enter a travel mode (e.g., a parallel mode) in which the output members (5) are driven by at least the driving force of the internal combustion engine (3) so as to cause a vehicle to travel. The third gear (G3) is in mesh with the fifth gear (G5) that rotates together with the counter shaft (31a), and the fourth gear (G4) is in mesh with the sixth gear (G6) that rotates together with the counter shaft (31a). The gear ratio between the third gear (G3) and the fifth gear (G5) differs from the gear ratio between the fourth gear (G4) and the sixth gear (G6). Consequently, the speed ratio between the second input member (13) and the output members (5) is changeable by switching between the state where the third gear (G3) is coupled to the second input member (13) and the state where the fourth gear (G4) is coupled to the second input member (13), which is made by the switching mechanism (51).

In the present structure, the seventh gear (G7), which rotates together with the counter shaft (31a) and is in mesh with the differential input gear (GD), is disposed between the fifth gear (G5) and the sixth gear (G6) in the axial direction (L), and the switching mechanism (51) is disposed between the third gear (G3) and the fourth gear (G4) in the axial direction (L). The third gear (G3) is in mesh with the fifth gear (G5), and the fourth gear (G4) is in mesh with the sixth gear (G6). Thus, disposing the switching mechanism (51) between the third gear (G3) and the fourth gear (G4) in the axial direction (L) enables the switching mechanism (51) to be disposed such that the location of the switching mechanism (51) in the axial direction (L) overlaps with the location of the seventh gear (G7) in the axial direction (L). This enables effective use of a space radially outward of the seventh gear (G7) in disposing the switching mechanism (51). The seventh gear (G7) in mesh with the differential input gear (GD) is disposed between the fifth gear (G5) and the sixth gear (G6) in the axial direction (L). Accordingly, the present structure facilitates disposing the differential gear unit (6) such that the area of overlapping of the locations of the differential gear unit (6) and the switching mechanism (51) in the axial direction (L) is larger than when the seventh gear (G7) is disposed on one of sides in the axial direction (L) relative to the fifth gear (G5) and the sixth gear (G6). Consequently, the present structure is able to make an entirety of the apparatus compact in size in the axial direction (L) when the apparatus includes the switching mechanism (51) to change the speed ratio between the second input member (13), which is drivingly coupled to the internal combustion engine (3), and the output members (5).

Locations of the seventh gear (G7) and the switching mechanism (51) in the axial direction (L) preferably overlap with each other.

This structure enables effective use of the space radially outward of the seventh gear (G7) in disposing the switching mechanism (51).

A length of the switching mechanism (51) in the axial direction (L) is preferably longer than a length of the seventh gear (G7) in the axial direction (L).

In this structure, the location of the switching mechanism (51) in the axial direction (L) is likely to be larger than when the length of the switching mechanism (51) in the axial direction (L) is equal to or shorter than the length of the seventh gear (G7) in the axial direction (L). In this respect, the vehicle drive transmission apparatus (100) according to the present disclosure enables the switching mechanism (51) to be disposed such that the locations of the switching mechanism (51) and the seventh gear (G7) in the axial direction (L) overlap with each other as previously mentioned. This would facilitate reducing the size of the entirety of the apparatus in the axial direction (L) if the length of the switching mechanism (51) in the axial direction (L) is longer than the length of the seventh gear (G7) in the axial direction (L) as in this structure.

The seventh gear (G7) is preferably smaller in diameter than the fifth gear (G5) and smaller in diameter than the sixth gear (G6).

This structure makes it possible to create a space located radially outward of the seventh gear (G7) such that each side of the space in the axial direction (L) is defined by an associated one of the fifth gear (G5) and the sixth gear (G6) and the space is open radially outward. This enables use of the space or a space radially outwardly adjacent thereto in disposing the switching mechanism (51) or a mechanism for driving the switching mechanism (51). Consequently, this structure facilitates creating the space in which the switching mechanism (51) or the mechanism for driving the switching mechanism (51) is to be disposed.

The second input member (13) and the internal combustion engine (3) are preferably disposed at different positions in the axial direction (L). The second gear (G2) is preferably disposed opposite to a location of the internal combustion engine (3) in the axial direction (L) relative to the third gear (G3) and the fourth gear (G4).

In this structure, the third gear (G3) and the fourth gear (G4) are disposed close to the internal combustion engine (3) in the axial direction (L) more easily than when the second gear (G2) is disposed on one side in the axial direction (L) where the internal combustion engine (3) is disposed (which will hereinafter be referred to as an "internal combustion engine side") relative to the third gear (G3) and the fourth gear (G4). Accordingly, the seventh gear (G7) and the differential input gear (GD) in mesh therewith are easily disposed close to the internal combustion engine (3) in the axial direction (L). For example, when an internal combustion engine side portion of the differential gear unit (6) is disposed to overlap with the location of a different device (e.g., a torque limiter (8) disposed in a power transmission path between the second input member (13) and the internal combustion engine (3)) in the axial direction (L), the differential input gear (GD) is disposed close to the internal combustion engine (3) in the axial direction (L) so as to facilitate increasing the area of overlapping of the locations of the differential gear unit (6) and the different device in the axial direction (L). Consequently, this structure facilitates reducing the size of an entirety of the vehicle drive transmission apparatus (100), or the size of an entirety of a unit including the vehicle drive transmission apparatus (100) and the different device, in the axial direction (L).

The differential input gear (GD) is preferably disposed on a first axial side (L1) relative to a center (40a) of a differential gear mechanism (40) of the differential gear unit (6) in the axial direction (L), the first axial side (L1) being a first side in the axial direction (L). The fifth gear (G5) is preferably larger in diameter than the sixth gear (G6) and is preferably disposed on the first axial side (L1) relative to the seventh gear (G7).

In this structure, the fifth gear (G5), which is one of the fifth and sixth gears (G5, G6) that is larger in diameter, is more easily disposed at a position away in the axial direction (L) from the center (40a), at which the differential gear unit (6) is likely to have a large radial size, than when the sixth gear (G6) is disposed on the first axial side (L1) relative to the seventh gear (G7). Accordingly, an axis (A5) on which the counter gear mechanism (31) is located and an axis (A4) on which the differential gear unit (6) is located are easily disposed close to each other in an axial view along the axial direction (L), while the fifth and sixth gears (G5, G6) and the differential gear unit (6) are prevented from interfering with each other. Consequently, this structure enables a reduction in the size of an entirety of the apparatus in a direction perpendicular to the axial direction (L).

The rotary electric machine (1) is preferably a first rotary electric machine (1). The apparatus preferably further includes: a third input member (12) drivingly coupled to a second rotary electric machine (2); and a third gear mechanism (22) that drivingly couples the third input member (12) and the differential input gear (GD) to each other without involvement by the second gear mechanism (23).

This structure makes it possible to connect a power transmission path between the third input member (12) and the differential input gear (GD) through the third gear mechanism (22). The vehicle drive transmission apparatus (100) is thus able to enter a travel mode (e.g., an electric vehicle mode or a series mode) in which the vehicle is caused to travel, with the first rotary electric machine (1) and the internal combustion engine (3) decoupled from the output members (5).

In the structure in which the apparatus includes the third input member and the third gear mechanism as described above, the counter gear mechanism (31) is preferably a first counter gear mechanism (31), and the third gear mechanism (22) preferably drivingly couples the third input member (12) and the differential input gear (GD) to each other through a second counter gear mechanism (32).

This structure more readily facilitates setting the speed ratio between the third input member (12) and the differential input gear (GD) to a desired value while more effectively preventing the differential input gear (GD) from being excessively large in diameter or preventing an eighth gear (G8) that rotates together with the third input member (12) from being excessively small in diameter than when the third gear mechanism (22) drivingly couples the third input member (12) and the differential input gear (GD) without involvement by the second counter gear mechanism (32).

The vehicle drive transmission apparatus according to the present disclosure is preferably able to achieve at least one of the effects described above.

DESCRIPTION OF THE REFERENCE NUMERALS 1 first rotary electric machine (rotary electric machine)
2 second rotary electric machine
3 internal combustion engine
4 wheel
5 output member
6 differential gear unit
11 first input member
12 third input member
13 second input member
21 first gear mechanism
22 third gear mechanism
23 second gear mechanism
31 first counter gear mechanism (counter gear mechanism)
31a first counter shaft (counter shaft)
32 second counter gear mechanism
40 differential gear mechanism
40a center
51 first switching mechanism (switching mechanism)
100 vehicle drive transmission apparatus
GD differential input gear
G1 first gear
G2 second gear
G3 third gear
G4 fourth gear
G5 fifth gear
G6 sixth gear
G7 seventh gear
L axial direction
L1 first axial side

The invention claimed is:

1. A vehicle drive transmission apparatus comprising:
a first input member drivingly coupled to a rotary electric machine;
a second input member drivingly coupled to an internal combustion engine;
a differential gear unit that includes a differential input gear and distributes rotation of the differential input gear to a pair of output members each drivingly coupled to an associated one of wheels;
a first gear mechanism that drivingly couples the first input member and the second input member to each other; and
a second gear mechanism that drivingly couples the second input member and the differential input gear to each other, wherein
the first gear mechanism includes
a first gear that rotates together with the first input member, and
a second gear that rotates together with the second input member and is in mesh with the first gear,
the second gear mechanism includes
a third gear mounted on the second input member,
a fourth gear mounted on the second input member, and
a counter gear mechanism,
the counter gear mechanism includes
a counter shaft,
a fifth gear that rotates together with the counter shaft and is in mesh with the third gear,
a sixth gear that rotates together with the counter shaft and is in mesh with the fourth gear, and
a seventh gear that rotates together with the counter shaft and is in mesh with the differential input gear,
a gear ratio between the third gear and the fifth gear differs from a gear ratio between the fourth gear and the sixth gear,
the seventh gear is disposed between the fifth gear and the sixth gear in an axial direction,
a switching mechanism is disposed between the third gear and the fourth gear in the axial direction, the switching mechanism being configured to make switching among
a state in which only the third gear of the third and fourth gears is coupled to the second input member,
a state in which only the fourth gear of the third and fourth gears is coupled to the second input member, and
a state in which both of the third gear and the fourth gear are decoupled from the second input member,
the differential input gear is disposed on a first axial side relative to a center of a differential gear mechanism of the differential gear unit in the axial direction, the first axial side being a first side in the axial direction,
the fifth gear is larger in diameter than the sixth gear and disposed on the first axial side relative to the seventh gear, the differential gear unit has a differential case that houses the differential gear mechanism and that is supported by a first bearing and a second bearing, the first bearing being located on the first side in the axial direction relative to the second bearing, and the sixth gear is disposed such that the sixth gear overlaps with the differential gear mechanism in the axial direction, and the fifth gear is disposed such that the fifth gear overlaps with the first bearing for the differential case in the axial direction.

2. The vehicle drive transmission apparatus according to claim 1, wherein
locations of the seventh gear and the switching mechanism in the axial direction overlap with each other.

3. The vehicle drive transmission apparatus according to claim 1, wherein
a length of the switching mechanism in the axial direction is longer than a length of the seventh gear in the axial direction.

4. The vehicle drive transmission apparatus according to claim 1, wherein
the seventh gear is smaller in diameter than the fifth gear and smaller in diameter than the sixth gear.

5. The vehicle drive transmission apparatus according to claim 1, wherein
the second input member and the internal combustion engine are disposed at different positions in the axial direction, and
the second gear is disposed opposite to a location of the internal combustion engine in the axial direction relative to the third gear and the fourth gear.

6. The vehicle drive transmission apparatus according to claim 1, wherein
the rotary electric machine is a first rotary electric machine, and
the vehicle drive transmission apparatus further comprises
a third input member drivingly coupled to a second rotary electric machine, and
a third gear mechanism that drivingly couples the third input member and the differential input gear to each other without involvement by the second gear mechanism.

7. The vehicle drive transmission apparatus according to claim 6, wherein
the counter gear mechanism is a first counter gear mechanism, and
the third gear mechanism drivingly couples the third input member and the differential input gear to each other through a second counter gear mechanism.

8. A vehicle drive transmission apparatus comprising:
a first input member drivingly coupled to a rotary electric machine;
a second input member drivingly coupled to an internal combustion engine;
a differential gear unit that includes a differential input gear and distributes rotation of the differential input gear to a pair of output members each drivingly coupled to an associated one of wheels;
a first gear mechanism that drivingly couples the first input member and the second input member to each other; and
a second gear mechanism that drivingly couples the second input member and the differential input gear to each other, wherein
the first gear mechanism includes a first gear that rotates together with the first input member, and
a second gear that rotates together with the second input member and is in mesh with the first gear,
the second gear mechanism includes
a third gear mounted on the second input member,
a fourth gear mounted on the second input member, and
a counter gear mechanism,
the counter gear mechanism includes
a counter shaft,
a fifth gear that rotates together with the counter shaft and is in mesh with the third gear,
a sixth gear that rotates together with the counter shaft and is in mesh with the fourth gear, and
a seventh gear that rotates together with the counter shaft and is in mesh with the differential input gear,
a gear ratio between the third gear and the fifth gear differs from a gear ratio between the fourth gear and the sixth gear,
the seventh gear is disposed between the fifth gear and the sixth gear in an axial direction,
a switching mechanism is disposed between the third gear and the fourth gear in the axial direction, the switching mechanism being configured to make switching among
a state in which only the third gear of the third and fourth gears is coupled to the second input member,
a state in which only the fourth gear of the third and fourth gears is coupled to the second input member, and
a state in which both of the third gear and the fourth gear are decoupled from the second input member,
the second input member is supported by a first bearing and a second bearing, and the second gear, the third gear, the fourth gear and the switching mechanism are disposed between the first bearing and the second bearing in the axial direction,
the counter shaft is supported by a third bearing and a fourth bearing, and the fifth gear, the sixth gear and the seventh gear are disposed between the third bearing and the fourth bearing in the axial direction, and
the third bearing is disposed such that the third bearing overlaps with the first bearing in the axial direction, and the fourth bearing is disposed such that the fourth bearing overlaps with the second bearing in the axial direction.

9. The vehicle drive transmission apparatus according to claim 8, wherein
locations of the seventh gear and the switching mechanism in the axial direction overlap with each other.

10. The vehicle drive transmission apparatus according to claim 8, wherein
a length of the switching mechanism in the axial direction is longer than a length of the seventh gear in the axial direction.

11. The vehicle drive transmission apparatus according to claim 8, wherein
the seventh gear is smaller in diameter than the fifth gear and smaller in diameter than the sixth gear.

12. The vehicle drive transmission apparatus according to claim 8, wherein
the second input member and the internal combustion engine are disposed at different positions in the axial direction, and
the second gear is disposed opposite to a location of the internal combustion engine in the axial direction relative to the third gear and the fourth gear.

13. The vehicle drive transmission apparatus according to claim 8, wherein
the differential input gear is disposed on a first axial side relative to a center of a differential gear mechanism of the differential gear unit in the axial direction, the first axial side being a first side in the axial direction, and
the fifth gear is larger in diameter than the sixth gear and disposed on the first axial side relative to the seventh gear.

14. The vehicle drive transmission apparatus according to claim 8, wherein
the rotary electric machine is a first rotary electric machine, and
the vehicle drive transmission apparatus further comprises
a third input member drivingly coupled to a second rotary electric machine, and
a third gear mechanism that drivingly couples the third input member and the differential input gear to each other without involvement by the second gear mechanism.

15. The vehicle drive transmission apparatus according to claim 14, wherein
the counter gear mechanism is a first counter gear mechanism, and
the third gear mechanism drivingly couples the third input member and the differential input gear to each other through a second counter gear mechanism.

16. A vehicle drive transmission apparatus comprising:
a first input member drivingly coupled to a rotary electric machine;
a second input member drivingly coupled to an internal combustion engine;
a differential gear unit that includes a differential input gear and distributes rotation of the differential input gear to a pair of output members each drivingly coupled to an associated one of wheels;
a first gear mechanism that drivingly couples the first input member and the second input member to each other; and
a second gear mechanism that drivingly couples the second input member and the differential input gear to each other, wherein
the first gear mechanism includes
a first gear that rotates together with the first input member, and
a second gear that rotates together with the second input member and is in mesh with the first gear,
the second gear mechanism includes
a third gear mounted on the second input member,
a fourth gear mounted on the second input member, and
a counter gear mechanism,
the counter gear mechanism includes
a counter shaft,
a fifth gear that rotates together with the counter shaft and is in mesh with the third gear,
a sixth gear that rotates together with the counter shaft and is in mesh with the fourth gear, and
a seventh gear that rotates together with the counter shaft and is in mesh with the differential input gear,
a gear ratio between the third gear and the fifth gear differs from a gear ratio between the fourth gear and the sixth gear,
the seventh gear is disposed between the fifth gear and the sixth gear in an axial direction,
a switching mechanism is disposed between the third gear and the fourth gear in the axial direction, the switching mechanism being configured to make switching among
a state in which only the third gear of the third and fourth gears is coupled to the second input member,
a state in which only the fourth gear of the third and fourth gears is coupled to the second input member, and
a state in which both of the third gear and the fourth gear are decoupled from the second input member,
the second input member and the internal combustion engine are disposed at different positions in the axial direction,
the second gear is disposed opposite to a location of the internal combustion engine in the axial direction relative to the third gear and the fourth gear,
the second input member is supported by a first bearing and a second bearing, and the second gear, the third gear, the fourth gear and the switching mechanism are disposed between the first bearing and the second bearing in the axial direction,
the counter shaft is supported by a third bearing and a fourth bearing, and the fifth gear, the sixth gear and the seventh gear are disposed between the third bearing and the fourth bearing in the axial direction, and
the second gear is larger in diameter than the third gear and larger in diameter than the fourth gear, and is disposed such that the second gear does not overlap with the third bearing, the fifth gear, the sixth gear, the seventh gear and the fourth bearing in the axial direction.

17. The vehicle drive transmission apparatus according to claim 16, wherein
locations of the seventh gear and the switching mechanism in the axial direction overlap with each other.

18. The vehicle drive transmission apparatus according to claim 16, wherein
a length of the switching mechanism in the axial direction is longer than a length of the seventh gear in the axial direction.

19. The vehicle drive transmission apparatus according to claim 16, wherein
the seventh gear is smaller in diameter than the fifth gear and smaller in diameter than the sixth gear.

20. The vehicle drive transmission apparatus according to claim 16, wherein
the differential input gear is disposed on a first axial side relative to a center of a differential gear mechanism of the differential gear unit in the axial direction, the first axial side being a first side in the axial direction, and
the fifth gear is larger in diameter than the sixth gear and disposed on the first axial side relative to the seventh gear.

* * * * *